United States Patent
Di Ronza et al.

(10) Patent No.: US 8,420,723 B2
(45) Date of Patent: Apr. 16, 2013

(54) MIX COMPRISING TRIALKOXYMERCAPTOALKYL-SILANES

(75) Inventors: Raffaele Di Ronza, Rome (IT); Davide Privitera, Avezzano (IT)

(73) Assignee: Bridgestone Corporation, Tokyo (JP)

( * ) Notice: Subject to any disclaimer, the term of this patent is extended or adjusted under 35 U.S.C. 154(b) by 372 days.

(21) Appl. No.: 12/864,352

(22) PCT Filed: Jan. 23, 2009

(86) PCT No.: PCT/EP2009/050804
§ 371 (c)(1),
(2), (4) Date: Oct. 13, 2010

(87) PCT Pub. No.: WO2009/092811
PCT Pub. Date: Jul. 30, 2009

(65) Prior Publication Data
US 2011/0021662 A1    Jan. 27, 2011

(30) Foreign Application Priority Data
Jan. 24, 2008    (IT) .............................. TO2008A0053

(51) Int. Cl.
*B60C 1/00* (2006.01)

(52) U.S. Cl.
USPC .......................... 524/262; 524/232; 524/318

(58) Field of Classification Search .................. 524/232, 524/262, 318
See application file for complete search history.

(56) References Cited

U.S. PATENT DOCUMENTS

| 5,834,536 A | 11/1998 | Scholl | |
| 2008/0161458 A1* | 7/2008 | Fox et al. ....................... | 524/262 |
| 2010/0160513 A1* | 6/2010 | Sandstrom .................... | 524/274 |

FOREIGN PATENT DOCUMENTS

| EP | 0 761 742 A1 | 3/1997 |
| GB | 1 501 420 A | 2/1978 |
| WO | 02/40582 A1 | 5/2002 |

* cited by examiner

*Primary Examiner* — Peter D Mulcahy
(74) *Attorney, Agent, or Firm* — Sughrue Mion, PLLC

(57) ABSTRACT

A method of producing a tire mix, including a first mixing step, in which a mix contains at least one cross-linkable unsaturated-chain polymer base, 10 to 100 phr of silica, and 1 to 20 phr of a silane bonding agent in the trialkoxymercaptoalkyl-silane class; and a final mixing step, in which a curing system is added to the mix. The silane bonding agent is used in adsorbed form on 0.5 to 2 phr of zinc oxide, and on 5 to 15 phr of carbon black. At the first mixing step, the mix contains 1 to 5 phr of one or more fatty acid derivatives, and, at the final mixing step, 1 to 2 phr of zinc oxide is added to the mix. The fatty acid derivatives are derived from condensation of a fatty acid, having a carbon number of 16 to 20, with an alcohol having a carbon number of 2 to 6, or with a primary or secondary amine having a carbon number of 2 to 6.

7 Claims, No Drawings

MIX COMPRISING TRIALKOXYMERCAPTOALKYL-SILANES

CROSS REFERENCE TO RELATED APPLICATIONS

This application is a National Stage of International Application No. PCT/EP2009/050804 filed Jan. 23, 2009, claiming priority based on Italian Patent Application No. TO2008A 000053 filed Jan. 24, 2008, the contents of all of which are incorporated herein by reference in their entirety.

TECHNICAL FIELD

The present invention relates to a mix comprising trialcoxymercaptoalkyl-silanes.

BACKGROUND ART

In certain mixes, such as tread mixes, silica has long been used instead of conventional carbon black as a reinforcing filler, because of the advantages of silica in terms of rolling resistance and wet road-holding capacity.

Silica is used in combination with silane bonding agents, which, by bonding with silanol groups, prevent the formation of hydrogen bonds between silica particles and, at the same time, clinch the silica chemically to the polymer base.

Recent findings show trialcoxymercaptoalkyl-silanes to be excellent silane bonding agents in terms of reducing rolling resistance and hydrocarbon emissions.

The formula I compound is the one which affords the best advantages.

$$SH(CH_2)_3SiR^1R^2_2 \qquad (I)$$

where
$R^1$ is —$OCH_2CH_3$ and
$R^2$ is —$O(CH_2CH_2O)_5(CH_2)_{13}CH_3$

Alongside the above advantages, however, trialcoxymercaptoalkyl-silanes have the drawback of impairing processing of the mix, and attempts to solve the problem have only resulted in impairing other characteristics of the mix, such as abrasion resistance and elasticity.

DISCLOSURE OF INVENTION

It is an object of the present invention to provide a mix in which trialcoxymercaptoalkyl-silane-class silane bonding agents can be used without impairing processing, and at the same time without impairing other significant characteristics of the mix.

According to the present invention, there is provided a method of producing a tyre mix, comprising a first mixing step, in which a mix comprises at least one cross-linkable unsaturated-chain polymer base, 10 to 100 phr of silica, and 1 to 20 phr of a silane bonding agent in the trialkoxymercaptoalkyl-silane class; and a final mixing step, in which a curing system is added to the mix; said method being characterized in that said silane bonding agent is used in adsorbed form on 0.5 to 2 phr of zinc oxide, and on 5 to 15 phr of carbon black; in that, at said first mixing step, the mix comprises 1 to 5 phr of one or more fatty acid derivatives; and in that, at said final mixing step, 1 to 2 phr of zinc oxide is added to the mix; said fatty acid derivatives deriving from condensation of a fatty acid, having a carbon number of 16 to 20, with an alcohol having a carbon number of 2 to 6, or with a primary or secondary amine having a carbon number of 2 to 6.

BEST MODE FOR CARRYING OUT THE INVENTION

Preferably, the silane bonding agent is in the trialkoxymercaptopropyl-silane class.

Preferably, the silane bonding agent is of formula I $$SH(CH_2)_3SiR^1R^2_2 \qquad (I)$$

where:
$R^1$ is —$OCH_2CH_3$ and
$R^2$ is —$(CH_2CH_2O)_5(CH_2)_{13}CH_3$

Preferably, 1.80 to 3 phr of sulphur is added to the mix at the final mixing step.

The following examples serve merely to give a clearer understanding of the invention, and are in no way limiting.

EXAMPLES

Four mixes were produced: two control mixes (A and B) and two mixes (C and D) in accordance with the teachings of the present invention. The control mixes were a known mix (A) comprising a traditional silane bonding agent; and a mix (B) which only differed from the known mix by comprising a trialkoxymercaptoalkyl-silane-class silane bonding agent.

The different methods of preparing control mixes A and B and mixes C and D according to the invention are shown below.

-Preparation of Mixes A and B-
(1st Mixing Step)

Prior to mixing, a 230-270-liter tangential-rotor mixer was loaded with the cross-linkable polymer base, silica, carbon black, silane bonding agent[1], oil, stearic acid, wax, and antioxidants to a fill factor of 66-72%.

The mixer was run at a speed of 40-60 rpm, and the mix was unloaded on reaching a temperature of 140-160° C.

(2nd Mixing Step)

The mix from the first step was again mixed in a mixer operated at 40-60 rpm, and was unloaded on reaching a temperature of 130-150° C.

(3rd Mixing Step)

The curing system and zinc oxide were added to the mix from the second step to a fill factor of 63-67%.

The mixer was run at a speed of 20-40 rpm, and the mix was unloaded on reaching a temperature of 100-110° C.

-Preparation of Mixes C and D-
(1st Mixing Step)

Prior to mixing, a 230-270-liter tangential-rotor mixer was loaded with the cross-linkable polymer base, silica, silane bonding agent[2] supported on zinc oxide and carbon black, oil, stearic acid, wax, antioxidants, and fatty acid derivatives to a fill factor of 66-72%.

The mixer was run at a speed of 40-60 rpm, and the mix was unloaded on reaching a temperature of 140-160° C.

(2nd Mixing Step)

The second mixing step described above was repeated.

(3rd Mixing Step)

The curing system and zinc oxide not used in the first step were added to the mix from the second step to a fill factor of 63-67%.

The mixer was run at a speed of 20-40 rpm, and the mix was unloaded on reaching a temperature of 100-110° C.

-Mix Compositions-

Table I shows the compositions of the mixes prepared using the method described above. The component quantities are expressed in parts by weight per hundred parts of total polymer base.

TABLE I

|  | A | B | C | D |
|---|---|---|---|---|
| SBR | 80 | 80 | 80 | 80 |
| Polybutadiene | 20 | 20 | 20 | 20 |
| Silica | 80 | 80 | 80 | 80 |
| Carbon black | 8 | 8 | 8* | 8* |
| Silane bonding agent[1] | 9 | — | — | — |
| Silane bonding agent[2] | — | 9 | 9** | 9** |
| Stearic acid | 2 | 2 | 2 | 2 |
| T-DAE oil | 30 | 30 | 30 | 30 |
| Total zinc oxide | 2.5 | 2.5 | 1.5 + 1.0* | 1.5 + 1.0* |
| Antioxidant | 3 | 3 | 3 | 3 |
| Wax | 1.5 | 1.5 | 1.5 | 1.5 |
| Sulphur | 1.75 | 1.75 | 1.75 | 1.85 |
| Accelerants | 2.0 | 2.0 | 2.0 | 2.0 |
| Fatty acid derivatives | — | — | 3 | 3 |

*indicates the quantities in phr added at the first mixing step with the silane bonding agent[1] adsorbed.
** indicates the silane bonding agent[2] was added to the mix adsorbed on part of the zinc oxide and on carbon black.

Silane bonding agent[1] means silane compound bis-(3-triethoxy-sililpropyl)-disulphide containing 65 to 80% disulphide.

Silane bonding agent[2] means the formula I silane compound.

Fatty acid derivatives mean a mixture of an amide, obtained by condensing fatty acid C18 with a methylpropylamine, and an ester, obtained by condensing fatty acid C18 with propanol.

-Laboratory Test Results-

The above mixes were tested to determine the values of a number of significant parameters of each mix.

Table II shows the results of each parameter for the four mixes.

The parameters tested were the following:
viscosity (ML1'4' at 130° C.) measured as per ASTM Standard D1646;
130° C. Mooney Scorch, measured as per ASTM Standard D1646;
abrasion resistance, measured as per DIN Standard 53516;
physical properties (ultimate elongation EB%, ultimate stress TB, M300% modulus), measured as per ASTM Standard D412C;
elasticity modulus (E') and Tan δ, measured as per ASTM Standard D5992.

The values shown in Table II are indexed to the 100 value of control mix A.

TABLE II

|  | A | B | C | D |
|---|---|---|---|---|
| ML1' + 4' at 130° C. | 100 | 130 | 100 | 100 |
| SCORCH | 100 | 60 | 100 | 100 |
| Abrasion resistance | 100 | 100 | 100 | 100 |
| EB (%) | 100 | 100 | 115 | 100 |
| TB | 100 | 100 | 95 | 100 |
| M300% | 100 | 100 | 85 | 100 |
| E' a 30° C. | 100 | 100 | 100 | 100 |
| Tanδ 100° C. | 100 | 70 | 70 | 70 |

As shown in Table II, the method according to the present invention (mixes C and D) enables the use of trialkoxymercaptoalkyl-silane-class silane bonding agents without impairing the other characteristics of the mix.

Adding the silane bonding agent adsorbed on the zinc oxide and carbon black counteracts the reduction in scorch time caused by the chemical nature of the silane bonding agent used, and maintains part of the zinc oxide at the final mixing step to counteract the reduction in abrasion resistance and elasticity modulus which would otherwise occur. Tests in fact confirm that the absence of zinc oxide at the final mixing step results in an unacceptable reduction in the abrasion resistance and elasticity modulus of the mix.

Moreover, the presence of fatty acid derivatives safeguards against excessive viscosity values.

Finally, as shown by comparing the values of mixes C and D in Table II, a larger than usual amount of sulphur provides for even making up for impairment of the physical properties of the mix caused by breakdown of the zinc oxide between the first mixing step and the final mixing step.

The invention claimed is:

1. A method of producing a tyre mix, comprising a first mixing step, in which a mix comprises at least one cross-linkable unsaturated-chain polymer base, 10 to 100 phr of silica, and 1 to 20 phr of a silane bonding agent of formula I; and a final mixing step, in which a curing system is added to the mix; wherein said silane bonding agent is used in adsorbed form on 0.5 to 2 phr of zinc oxide, and on 5 to 15 phr of carbon black; at said first mixing step, the mix comprises 1 to 5 phr of one or more fatty acid derivatives; and at said final mixing step, 1 to 2 phr of zinc oxide is added to the mix;

where:
$R^1$ is —$OCH_2CH_3$ and
$R^2$ is —$O(CH_2CH_2O)_5(CH_2)_{13}CH_3$.

2. A method of producing a tyre mix as claimed in claim 1, wherein said fatty acid derivatives are derived from condensation of a fatty acid, having a carbon number of 16 to 20, with an alcohol having a carbon number of 2 to 6, or with a primary or secondary amine having a carbon number of 2 to 6.

3. A method of producing a tyre mix as claimed in claim 2, wherein 1.80 to 3 phr of sulphur is added to the mix at said final mixing step.

4. A method of producing a tyre mix as claimed in claim 1, wherein, at said first mixing step, the mix comprises 80 phr of silica; 9 phr of silane bonding agent adsorbed on 1 phr of zinc oxide, and on 8 phr of carbon black; and 3 phr of fatty acid derivatives; and in that 1.85 phr of sulphur and 1.5 phr of zinc oxide are added to the mix at the final mixing step.

5. A tyre mix produced using the method as claimed in claim 1.

6. A tread made from the mix as claimed in claim 5.

7. A tyre comprising a tread as claimed in claim 6.

* * * * *